United States Patent
Cai et al.

(10) Patent No.: US 7,818,881 B2
(45) Date of Patent: Oct. 26, 2010

(54) VEHICLE EXHAUST COMPONENT ASSEMBLY USING MAGNETIC PULSE WELDING

(75) Inventors: Haimian Cai, Ann Arbor, MI (US); Baoluo Chen, Rochester Hills, MI (US); Hui Wang, Ann Arbor, MI (US); Robert Schoenborn, Livonia, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 973 days.

(21) Appl. No.: 11/527,187

(22) Filed: Sep. 26, 2006

(65) Prior Publication Data

US 2008/0072584 A1 Mar. 27, 2008

(51) Int. Cl.
*B23P 17/00* (2006.01)
*B23P 11/00* (2006.01)
*B21D 51/16* (2006.01)
*F01N 1/00* (2006.01)

(52) U.S. Cl. ............... 29/890.08; 29/419.2; 29/525.14; 29/890; 60/323

(58) Field of Classification Search ........... 60/322–323; 29/529, 890, 890.08, 890.129, 419.2, 525.14
See application file for complete search history.

(56) References Cited

U.S. PATENT DOCUMENTS

| | | | | |
|---|---|---|---|---|
| 4,930,817 A | * | 6/1990 | Fuchs | ................... 285/189 |
| 6,122,911 A | | 9/2000 | Maeda et al. | |
| 6,255,631 B1 | * | 7/2001 | Kichline et al. | ............. 219/617 |
| 6,510,920 B1 | | 1/2003 | Durand | |
| 6,921,013 B1 | * | 7/2005 | Kichline et al. | ............. 228/115 |
| 7,015,435 B2 | | 3/2006 | Yablochnikov | |
| 7,462,332 B2 | * | 12/2008 | Hardesty et al. | ............. 422/179 |
| 2004/0074095 A1 | * | 4/2004 | Stempien et al. | ......... 29/890.08 |

FOREIGN PATENT DOCUMENTS

KR 2002090997 A * 12/2002

* cited by examiner

*Primary Examiner*—Thomas E Denion
*Assistant Examiner*—Audrey Klasterka
(74) *Attorney, Agent, or Firm*—Frank L. Lollo; MacMillan, Sobanski & Todd, LLC (57) ABSTRACT

A vehicle exhaust system is provided that includes a first exhaust member having an end that includes an enlarged section. A second exhaust member is sized to receive a portion of the first exhaust member. The enlarged section of the first exhaust member has an outer diameter that is larger than an inner diameter of at least one section of the second exhaust member for creating an interference condition between the first and second exhaust member to prevent axial movement of the first exhaust member in at least one axial direction. The first exhaust member is secured to the second exhaust member by magnetic pulse welding.

14 Claims, 7 Drawing Sheets

VEHICLE EXHAUST COMPONENT ASSEMBLY USING MAGNETIC PULSE WELDING

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of the Invention

This invention relates in general to a vehicle exhaust system, and more specifically, to permanently affixing the vehicle exhaust system components using magnetic pulse welding.

2. Background of Related Art

Exhaust systems typically include a plurality of exhaust members that are joined to one another by metal inert gas (MIG) or tungsten inert gas (TIG) welding. The coupling of exhaust members together requires that the coupled joints be leak-proof. Traditional MIG and TIG welding methods present several disadvantages. For example, there is a potential physical interface issue between the head of welding device and the head of a bolt (for fastening a flange member to respective exhaust member) when fastening the exhaust pipe/tube to a flange of the exhaust system. In addition, the conventional welding process requires long cycle times to weld a single circumferential seam resulting in environmental cleanup issues.

BRIEF SUMMARY OF THE INVENTION

The present invention provides a method for joining two members of an exhaust system to one another utilizing a magnetic pulse welding operation. An interference condition created by a flared section of at least one of the adjoining exhaust members provide additional weld strength support for preventing axial movement in at least one direction which could otherwise weaken the magnetic pulse welded joint.

In one aspect of the present invention, a vehicle exhaust system is provided that includes a first exhaust member having an end that includes an enlarged section. A second exhaust member is sized to receive a portion of the first exhaust member. The enlarged section of the first exhaust member has an outer diameter that is larger than an inner diameter of at least one section of the second exhaust member for creating an interference condition between the first and second exhaust member to prevent axial movement of the first exhaust member in at least one axial direction. The first exhaust member is secured to the second exhaust member by magnetic pulse welding.

In yet another aspect of the present invention, a method is provided for coupling components of a vehicle exhaust system. A first exhaust member is provided. The first exhaust member is inserted within a second exhaust member. The first exhaust member is extended through the second exhaust member until a respective portion of the first exhaust member is aligned with a respective portion of the second exhaust member. The first exhaust member is secured to the second exhaust member using magnetic pulse welding where a section of the first exhaust member creates an interference condition with a section of the second exhaust member for preventing axial movement in at least one axial direction.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
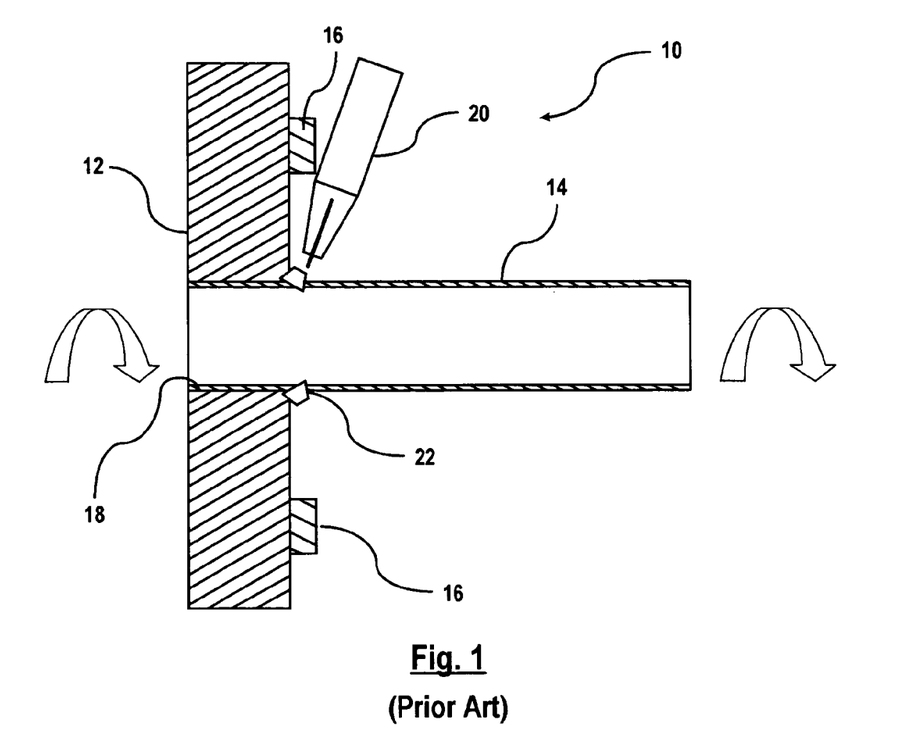
FIG. 1 cross-section view of an exhaust joint formed by a prior art weld operation.
Figure 2:
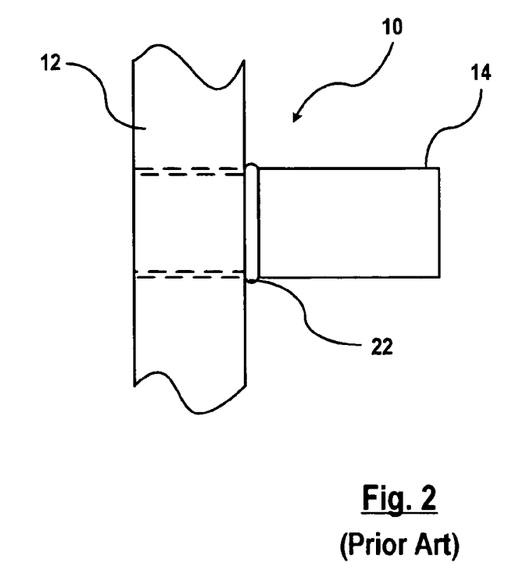
FIG. 2 is a side view of an assembled exhaust joint formed by the prior art weld operation.

FIGS. 1 and 2 show a cross-section view and a side view, respectively, of exhaust system components coupled to one another by a prior art weld operation. An illustration of a pair of exhaust members, such as a pipe assembly exhaust converter outlet, is shown generally at 10. The pair of coupled exhaust members 10 includes a flange member 12 and a pipe member 14.

The flange member 12 includes a plurality of bolts 16 that are used to couple the flange member 12 to a third exhaust member (not shown). The pipe member 14 is secured to the flange member 12 by inserting the pipe member 14 within receiving section 18 (i.e., bore) of the flange member 12 to form a pre-assembly and then welded together at an adjoining location. The flange member 12 and pipe member 14 are welded together utilizing a TIG welding technique or a MIG welding technique. To weld the pre-assembly together using prior art methods, the pre-assembly is secured within a fixture and (not shown) rotated while a welding gun 20 is held in a fixed position with respect to the pre-assembly for forming a weld seam 22. As the pre-assembly is rotated, the weld seam 22 is formed circumferentially around the pre-assembly at the adjoining location of the flange member 12 and the pipe member 14.

Several disadvantages may result when welding together the flange member 12 and the pipe member 14 while utilizing the prior art processes. First, there is a potential for an interference between the welding gun 20 and the plurality of bolts 16 such that bolts 16 strike weld gun 20 as the pre-assembly is rotated during the welding operation. Secondly, linear welding typically requires long cycle times to weld a single continuous seam 22 in addition to the time required to cool the component down. Other disadvantages include the additional cost of the welding wire used to create the weld and the use of shielding gases. Shielding gases are used primarily to protect the molten metal from oxidation and contamination and can influence arc and metal transfer characteristics, weld penetration, surface-shape patterns, and welding speed. The walls of the pipe assembly may be burnt through if not closely monitored. Dimensional distortions may occur after welding due to thermal residual stresses on the respective members. The consistency of the welding quality is constantly challenged. The parent material's strength of each member is deteriorated by the welding operation. Moreover, welding is not environmentally friendly as pollutants, such as smoke, are generated during the welding operation.

Figure 3:
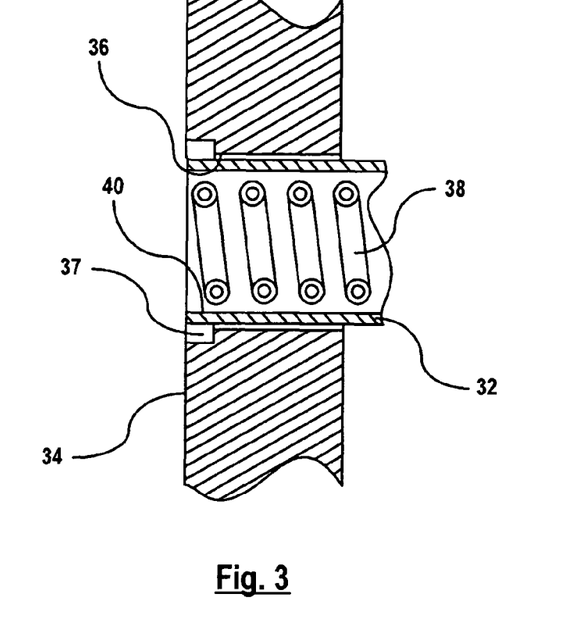
FIG. 3 is a cross-section view of a pre-assembled exhaust joint according to a first preferred embodiment of the present invention.
Figure 4:
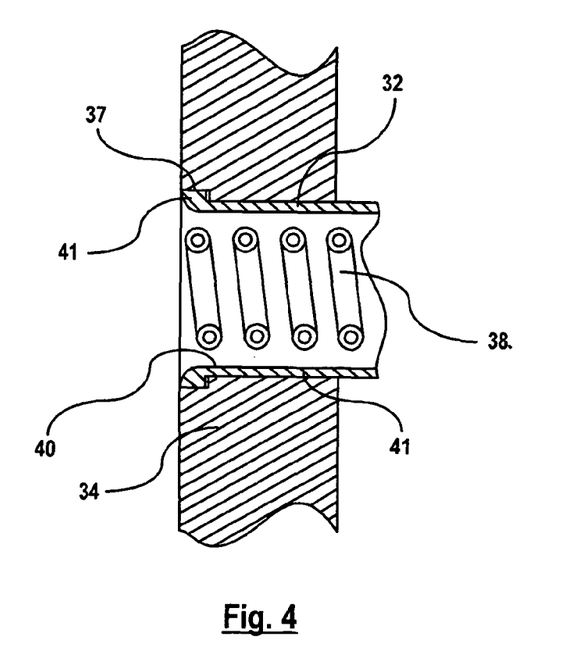
FIG. 4 is a cross-section view of a welded exhaust joint according to the first preferred embodiment of the present invention.

FIG. 3 and FIG. 4 illustrate a first preferred embodiment of a joint coupling between a first exhaust member 32 and a second exhaust member 34. The first exhaust member 32 is preferably a stainless steel tube that includes an outer diameter that is smaller than the inner diameter of a receiving section 36 of the second exhaust member 34. Alternatively, materials other than stainless steel metal may be used. The second exhaust member 34 may be a flange member or a tubular member for receiving the first exhaust member 32. The first exhaust member 32 is inserted within the receiving section 36 to form a pre-assembly prior to securing the first exhaust member 32 and the second exhaust member 34 to one another.

The receiving section 36 of the second exhaust member 34 includes a substantially uniform inner diameter with a stepped surface 37, such as a counter bore, at a distal end of the receiving section 36. The first exhaust member 32 and the second exhaust member 34 are secured to one another by a magnetic pulse welding (MPW) operation. MPW is a high-speed welding process for coupling metal components, preferably tubular components in an overlapping configuration. MPW includes an inductive coil 38 coupled to a capacitive power supply (not shown) which generates large current flows when discharge occurs from the capacitive power supply. The inductive coil 38 is coupled to and carried by a movable support member (not shown).

The inductive coil 38 is inserted within first exhaust member 32 by the movable member. As the inductive coil 38 is energized by the power source, a large current flows through the inductive coil 38 thereby generating a high intensity field around the inductive coil 38. The field induces eddy currents in a metal structure 40 surrounding the inductive coil 38. The current flow generated by the inductive coil 38 and the eddy currents induced in the surrounding metal structure 40 of the first exhaust member 32 create opposing magnetic fields. The opposing metal fields repel one another. Since the currents in the inductive coil 38 are very strong in comparison to the eddy currents generated in the surrounding material 40, the surrounding metal 40 is forced away from the inductive coil 38 at very high velocity in the direction of the surrounding receiving section 36 of the second exhaust member 34. The outer surface of the first exhaust member 32 impacts the inner surface of the receiving section 36 at a very high velocity thereby fusing the impacting surfaces together. The coupling of the two surfaces is very similar to explosive welding.

An end section 41 of the first exhaust member 32 overlapping the stepped surface 37 of the first exhaust member 34 is forced into the recessed region within the stepped surface 37 by the magnetic force exerted on the end section 41. The end section 41 is substantially contoured to the shape of the stepped surface 37 creating an interlocking feature between the first exhaust member 32 and the second exhaust member 34 for preventing any movement in at least one axial direction. FIG. 4 illustrates the resulting weld between the first exhaust member 32 and second exhaust member 34 formed by the MPW operation. The inductive coil 38 is removed after the welding operation is complete. MPW provides much faster operational weld times than conventional welding methods, such as MIG and TIG welding, since the MPW is substantially an explosive weld and is acted on the entire weld joint at the substantially the same time whereas conventional welding methods use a linear welding operation which increases the operation weld time as the surface area required for welding increases. Other advantages of utilizing MPW is that manufacturing costs are greatly reduced, joint strength is enhanced, and the quality is improved such that the base materials maintain their mechanical properties and avoid burn through and welding splatter that are commonly produced by conventional welding operations. Moreover, the interlocking feature provides the additional benefit of preventing axial movement between the two exhaust members in at least one axial direction which could otherwise potentially weaken the fixed joint.

Figure 5:
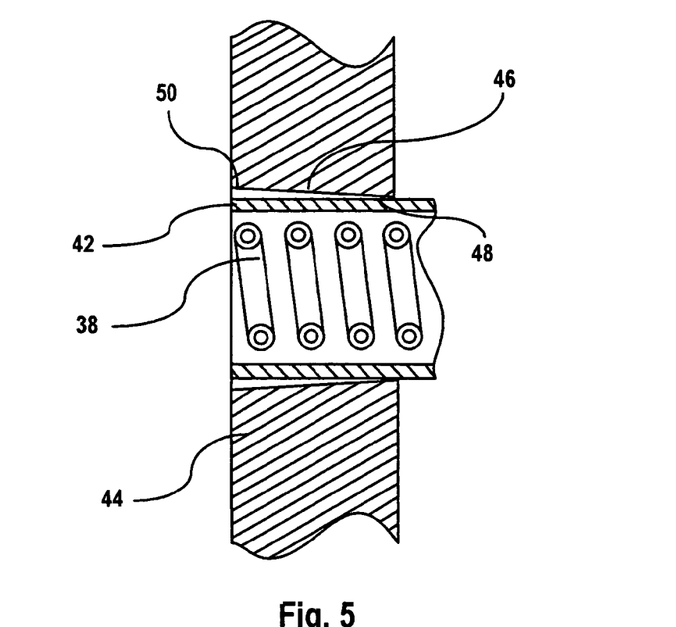
FIG. 5 is a cross-section view of a pre-assembled exhaust joint according to a second preferred embodiment of the present invention.
Figure 6:
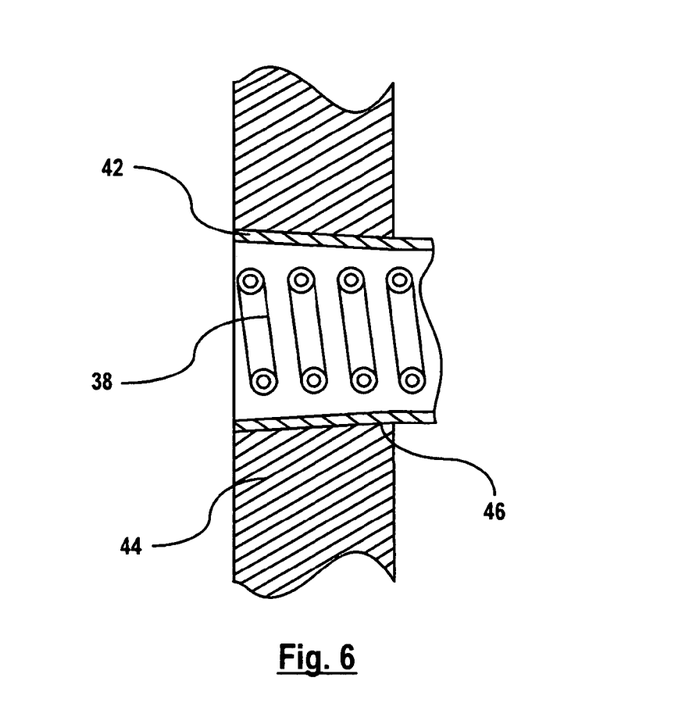
FIG. 6 is a cross-section view of a welded exhaust joint according to the second preferred embodiment of the present invention.

FIG. 5 and FIG. 6 illustrate a second preferred embodiment for the coupling of a first exhaust member 42 to the second exhaust member 44. The first exhaust member 42 is the same design as that described and shown in FIG. 3 prior to deformation. The second exhaust member 44 includes a receiving section 46 having a tapered inner bore. An inner diameter at a first end 48 of the receiving section 46 is slightly larger than the outer diameter of the first exhaust member 42. The tapered inner bore increasingly widens as the receiving section 46 extends to a second end 50. The diameter of the second-end 50 is larger than the diameter of the first end section 48.

As the inductive coil 38 is inserted into the receiving section 46 of the first exhaust member 42 and energized, the magnetic force generated by the inductive coil 38 thrusts the first exhaust member 42 toward the inner walls of the receiving section 46. The first exhaust member 42 impacts the receiving section 46 and forms a flared section (i.e., tapered section) for the portion of the first exhaust member 42 seated within the second exhaust member 44. The finished joint is an impact welded joint having an interference condition which prevents axial movement in at least one direction.

Figure 7:
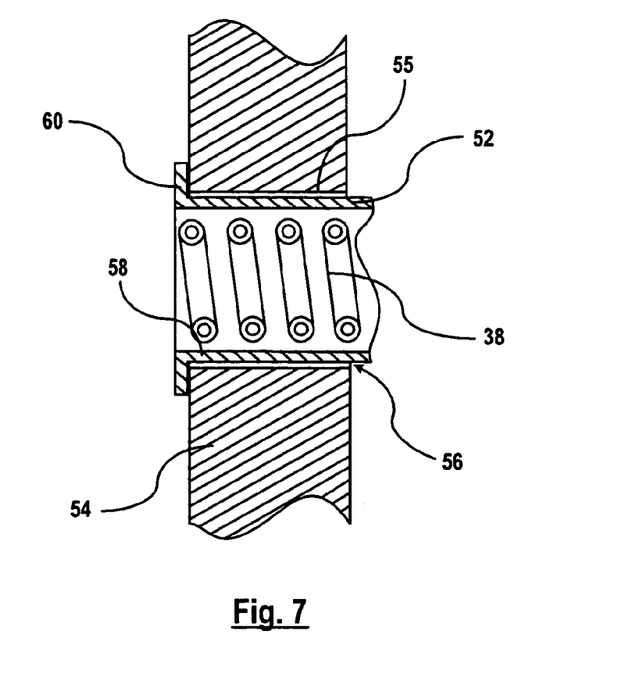
FIG. 7 is a cross-section view of a pre-assembled exhaust joint according to a third preferred embodiment of the present invention.
Figure 8:
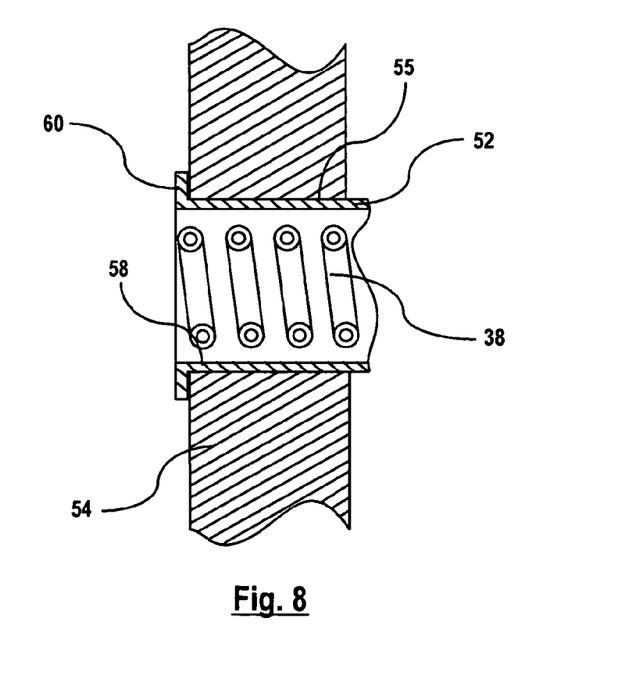
FIG. 8 is a cross-section view of a welded exhaust joint according to the third preferred embodiment of the present invention.

FIG. 7 and FIG. 8 illustrate a third preferred embodiment for coupling a first exhaust member 52 to a second exhaust member 54. The second exhaust member 54 includes a receiving section 55 with a substantially uniform bore 56 extending therethrough. The first exhaust member 52 is a member having a substantially uniform inner diameter. An end section 58 of the first exhaust member 52 includes a flange 60. The flange 60 extends at a substantially 90 degree angle with respect to the longitudinal axis of the tubular portion of the first exhaust member 52. The flange 60 includes an outer diameter that is substantially larger than the inner diameter of the receiving section 55 of the second exhaust member 54 such that the flange 60 is not capable of passing through the receiving section 55 of the second exhaust member 54.

As the first exhaust member 52 is fully inserted within the receiving section 55 of the second exhaust member 54, the flange 60 abuts a side surface of the second exhaust member 54 for creating an interference condition. This prevents the first exhaust member 52 from axial movement in at least one direction. After the first exhaust member 52 is inserted and aligned within the receiving section 55 of the second exhaust member 54, the inductive coil 38 is inserted within the first exhaust member 52 and is energized. The wall of the first exhaust member 52 is thrust radially outward for magnetically pulse welding the first exhaust member 52 to the second exhaust member 54.

Figure 9:
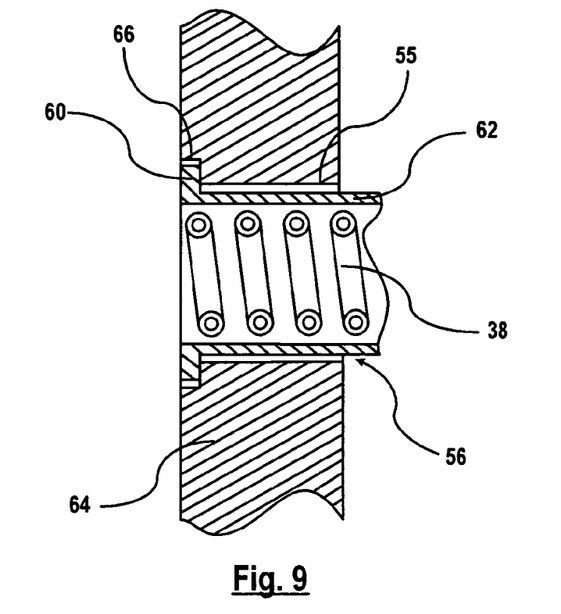
FIG. 9 is a cross-section view of a pre-assembled exhaust joint according to a fourth preferred embodiment of the present invention.
Figure 10:
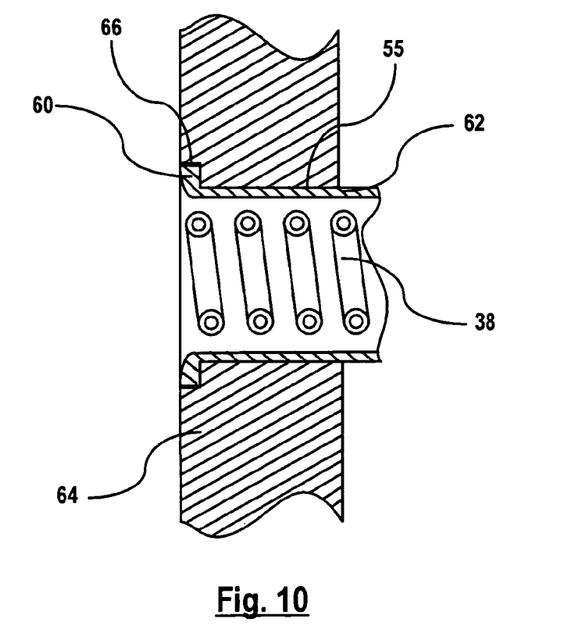
FIG. 10 is a cross-section view of a welded exhaust joint according to the fourth preferred embodiment of the present invention.

FIG. 9 and FIG. 10 illustrate a fourth preferred embodiment for coupling a first exhaust member 62 to a second exhaust member 64. The first exhaust member 62 and the second exhaust member 64 are substantially the same as the exhaust members shown FIG. 7 with the addition of a stepped surface 66 at a distal end of the receiving section 55 of the second exhaust member 54. An end opposite the flange 60 of the first exhaust member 62 is inserted within the bore 56 of the second exhaust member 64 and extended therethrough. As the first exhaust member 62 is extended through the bore 56, the flange 60 nests within the stepped surface 66 and becomes seated within the stepped surface 66 such that the flange 60 for creating an interference condition. The interference condition prevents the first exhaust member 62 from passing further through the receiving section 55 of the second exhaust member 64. After the first exhaust member 62 is seated within the stepped surface 66 of the second exhaust member 64, the inductive coil 38 is inserted within the first exhaust member 62 and is energized. The wall of the first exhaust member 62 is thrust radially outward for magnetically pulse welding the first exhaust member 62 to the second exhaust member 64. In addition, the first exhaust member 62 and second exhaust member 64 are interlocked at the stepped surface 66 for preventing axial movement in at least one direction.

Figure 11:
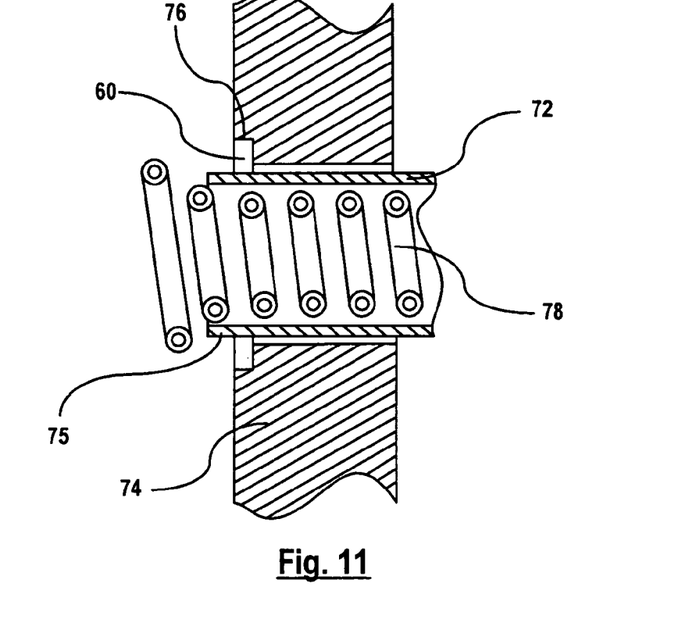
FIG. 11 is a cross-section view of a pre-assembled exhaust joint according to a fifth preferred embodiment of the present invention.
Figure 12:
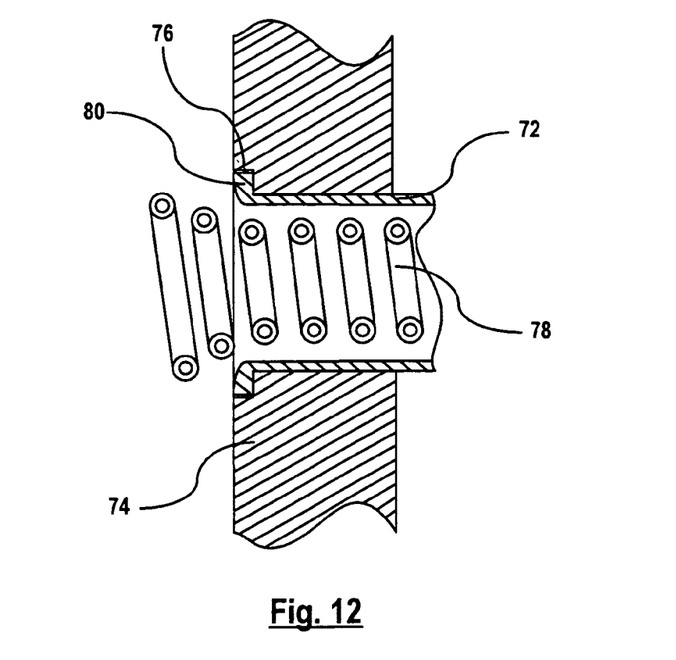
FIG. 12 is a cross-section view of a welded exhaust joint according to the fifth preferred embodiment of the present invention.

FIG. 11 and FIG. 12 illustrate a fifth preferred embodiment for coupling a first exhaust member 72 and a second exhaust member 74. The first exhaust member 72 is substantially a uniform tubular member prior to being welded to a second exhaust member 74. The second exhaust member 74 is similar to the second exhaust member shown in FIG. 9. An induction coil 78 includes an enlarged section of coils for forming a flange 80 on the first exhaust member 72. The first exhaust member 72 is inserted within the second exhaust member 74. An end section 75 of the first exhaust member extends beyond the second exhaust member 74 as the first exhaust member 74 is extended therethrough. The inductive coil 78 is inserted within the first exhaust member 72 and is energized. The wall of the first exhaust member 72 is thrust radially outward for magnetically pulse welding the first exhaust member 72 to the second exhaust member 74. In addition, the end section 75 of the first exhaust member 72 is bent and thrust in an axial direction for forming the flange 80 within a stepped surface 76 of the second exhaust member 74. The first exhaust member 72 and second exhaust member 74 are interlocked at the stepped surface 76 for preventing axial movement in at least one direction.

Alternatively, the second exhaust member includes only a uniform bore with no stepped surface. The end section of the first exhaust member may be bent and thrust in an axial direction by the induction coil for forming the flange and abutting the flange against a side surface of the second exhaust member similar to the weld joint shown in FIG. 8.

Figure 13:
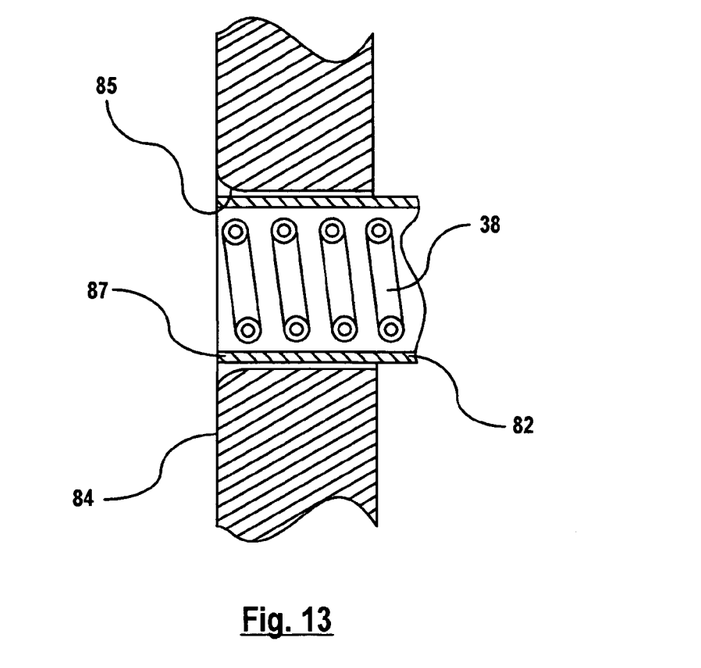
FIG. 13 is a cross-section view of a pre-assembled exhaust joint according to a sixth preferred embodiment of the present invention.
Figure 14:
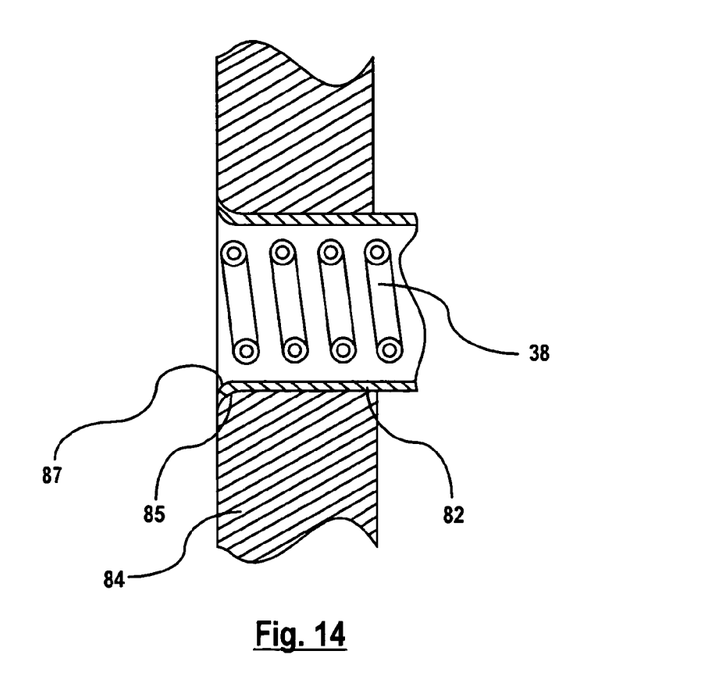
FIG. 14 is a cross-section view of a welded exhaust joint according to the sixth preferred embodiment of the present invention.

FIGS. 13 and 14 illustrate a sixth preferred embodiment for coupling a first exhaust member 82 and a second exhaust member 84. The first exhaust member 82 is substantially a uniform tubular member prior to being welded to a second exhaust member 84. The second exhaust member 84 includes an end section 85 that is flared. The inductive coil 38 is inserted within the first exhaust member 82 and is energized. Alternatively, the inductive coil shown in FIG. 11 may be used. The wall of the first exhaust member 82 is thrust radially outward for magnetically pulse welding the first exhaust member 82 to the second exhaust member 84. In addition, an end section 87 of the first exhaust member 82 is thrust radially outward against the flared end section 85 of the second exhaust member 84 for flaring the end section 87 of the first exhaust member 82. An interference condition is created by the respective opposing flared sections 85 and 87 for preventing axial movement in at least one direction.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle exhaust system comprising:
   a first exhaust member having an end that includes an enlarged section; and
   a second exhaust member sized to receive a portion of the first exhaust member, the enlarged section of the first exhaust member having an outer diameter that is larger than an inner diameter of at least one section of the second exhaust member for creating an interference condition between the first and second exhaust member to prevent axial movement of the first exhaust member in at least one axial direction, the second exhaust member including a receiving section that is a stepped surface for receiving the enlarged section of the first exhaust member, the first exhaust member having a first impact surface overlapping a second impact surface of the second exhaust member, the first exhaust member further including a stepped surface that nests with the stepped surface of the second exhaust member, wherein the first impact surface of the first exhaust member is fused to the second impact surface of the second exhaust surface by magnetic pulse welding for securing the first exhaust member to the second exhaust member, and wherein the stepped surface of the first exhaust member is formed during the magnetic pulse welding.

2. The vehicle exhaust system of claim 1 wherein the stepped surface of the second exhaust member includes a counter bore.

3. The vehicle exhaust system of claim 1 wherein a distal end of the enlarged section includes a flange.

4. The vehicle exhaust system of claim 1 wherein a distal end of the enlarged section includes a flared section.

5. The vehicle exhaust system of claim 1 wherein the first exhaust member is inserted within the second exhaust member to form a pre-assembly.

6. A method for coupling components of a vehicle exhaust system, the method comprising the steps of:
providing a first exhaust member;
inserting the first exhaust member within a second exhaust member;
extending the first exhaust member through a first end of the second exhaust member until a respective portion of the first exhaust member is aligned with a respective portion of the second exhaust member, the first exhaust member having a first impact surface that is aligned with a second impact surface of the second exhaust member when an end of the first exhaust member extending through the second exhaust member is aligned with a distal end of the second exhaust member, the distal end of the second exhaust member including an enlarged section; and
securing the entire impact surface of the first exhaust member to the entire impact surface of the second exhaust member using magnetic pulse welding, wherein a section of the first exhaust member creates an interference condition with a section of the second exhaust member for preventing axial movement in at least one axial direction.

7. The method of claim 6 wherein the second exhaust member includes a tapered section, the method further comprising the step of radially deforming the first exhaust member to form an opposing tapered section abutting the tapered section of the second exhaust member for preventing axial movement in at least one direction.

8. The method of claim 6 wherein the second exhaust member includes a stepped section, the method further comprising the step of radially deforming the first exhaust member to form a flange secured in the stepped section of the second exhaust member for preventing axial movement in at least one direction.

9. The method of claim 6 wherein the first exhaust member includes a flange and wherein the first exhaust member is extended through the second exhaust member until the flange abuts a portion of the second exhaust member.

10. The method of claim 9 wherein the flange abuts a side surface of the second exhaust member for aligning the first exhaust member and second exhaust member as a pre-assembly.

11. The method of claim 9 wherein the flange is nested within a stepped section formed in the second exhaust member.

12. The method of claim 11 wherein the flange abuts the stepped section for aligning the first exhaust member and second exhaust member as a pre-assembly.

13. The method of claim 9 wherein the flange is formed by the magnetic pulse weld operation.

14. The method of claim 13 wherein the magnetic pulse weld operation includes inserting an induction coil within the first exhaust member, wherein the induction coil is energized for performing the magnetic pulse weld operation, and wherein the induction coil includes an enlarged section for forming the flange.

* * * * *